R. ALLEN.
PACKING FOR RODS AND THE LIKE.
APPLICATION FILED NOV. 15, 1911.

1,165,486.

Patented Dec. 28, 1915.

Witnesses
L. B. James
M. W. Somers

Inventor
Robert Allen
by H. B. Willson & Co
Attorneys

UNITED STATES PATENT OFFICE.

ROBERT ALLEN, OF CAVERSHAM, ENGLAND.

PACKING FOR RODS AND THE LIKE.

1,165,486.   Specification of Letters Patent.   Patented Dec. 28, 1915.

Application filed November 15, 1911.   Serial No. 660,501.

*To all whom it may concern:*

Be it known that I, ROBERT ALLEN, a subject of the King of Great Britain, residing at "Lynwood," Kidmore Road, Caversham, Oxfordshire, England, have invented certain new and useful Improvements in Packing for Rods and the like; and I do declare the following to be a full, clear, and exact description of the invention, such as will enable others skilled in the art to which it appertains to make and use the same.

This invention for an improved packing for piston rods and the like relates to packing of the type in which segmental rings pressed against the rod by the working pressure or springs are used in conjunction with continuous rings. Heretofore it has been difficult to give the necessary freedom to the rod and at the same time to prevent leakage either between the rod and packing or between the packing rings and stuffing box or casing.

My invention has for its object to so construct the packing that the leakage aforesaid cannot occur.

The characteristic feature of my invention is that the cross sectional dimensions of the segmental rings are such that the steam or other fluid pressure medium on obtaining access to the rings exerts an axial pressure on the rings which is much greater than the fluid pressure acting radially inward so that the friction between the segmental packing rings and the adjacent continuous rings is sufficient to counteract the radial fluid pressure and keep the ring balanced.

A further feature of the invention is that packing fluid pressure is applied to the rings by obliquely mounted springs whose pressure is divided into radial and axial components.

The invention is illustrated in the accompanying drawings in which—

Figure 1:
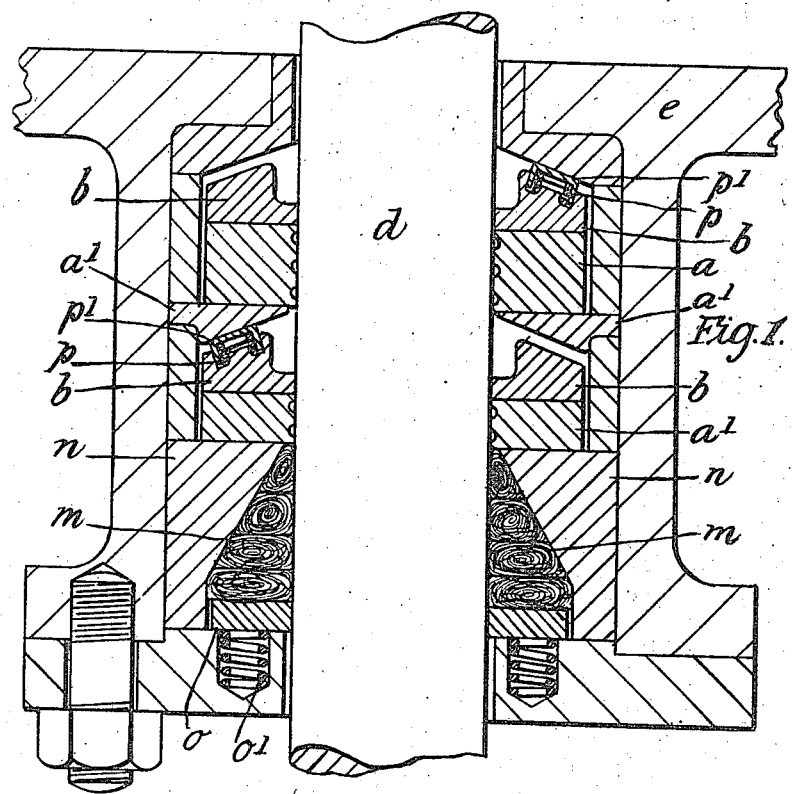
Figure 2:
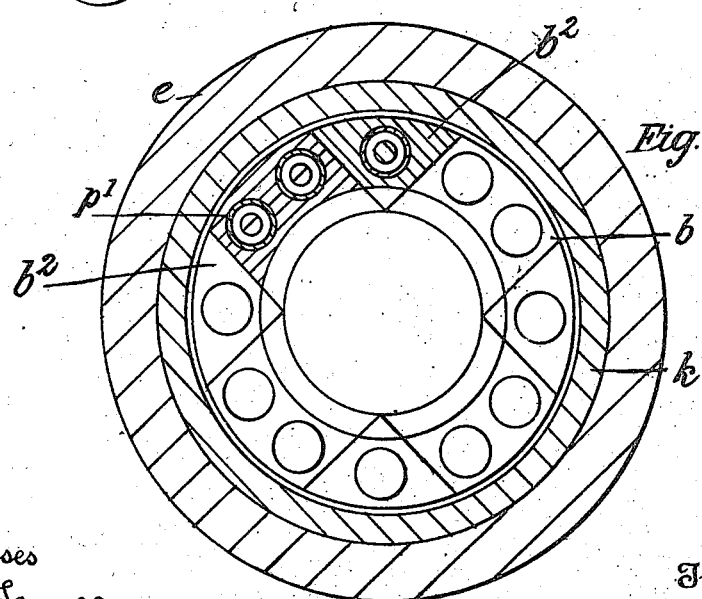

Figures 1 and 2 are longitudinal and transverse sections respectively of a metallic packing constructed according to this invention.

As shown, the packing comprising two segmental rings $b$, continuous rings $a\ a'$ and a soft packing $m$ surrounded by a sleeve $n$ with a conical bore, the packing $m$ being pressed axially by means of a ring $o$ and springs $o'$ seated in the end of the stuffing box. Preferably one or more of the plain rings $a\ a'$ are arranged to fit closely to the rod $d$ but loosely to the stuffing box or casing $e$ and one or more of the rings $a\ a'$ fit closely to the casing $e$ and loosely on the rod. The segmental rings $b$ are forced inward against the rod by springs $p$ mounted obliquely as shown and serving also to apply axial pressure for keeping the segments up against the adjacent continuous rings $a\ a'$. The faces of said segmental rings $b$ which engage the adjacent faces of the continuous rings $a\ a'$ are flat and straight while the opposite faces of said rings are inclined downwardly and outwardly for a portion of their width, each of said rings being provided with a recess in its inclined face adjacent the central opening therein whereby the area in contact with the rod D is greatly reduced in proportion to the area engaged with the adjacent continuous rings, and the shape of the rings being such as to counterbalance the radial pressure and thus keep the rings $b$ balanced when steam or other fluid pressure medium gains access thereto. The springs $p$ are seated in recesses in the rings and are inclosed by metal caps $p'$. The V-shaped spaces between the packing segments are filled by V-shaped blocks $b^2$ provided in a similar manner to the segments $b$ with obliquely mounted springs. The cross sectional dimensions of the segmental rings $b$ are such that where the steam or other fluid pressure medium gains access thereto the resulting axial pressure in the rings is so much greater than the pressure acting radially inward that the friction between the ring $b$ and the adjacent rings $a$ or $a'$ is sufficient to counteract the radial pressure and thus keep the ring $b$ balanced. To effect this the depth or radial dimension of the ring should be about 5 to 8 times the rubbing width.

I claim as my invention:—

1. A packing for piston rods and the like comprising a stuffing box or casing, continuous rings surrounding the member to be packed, pressure balanced segmental packing rings alternating with the continuous rings, and springs positioned to press the segmental rings inward against the member to be packed and against the continuous rings.

2. A packing for piston rods and the like comprising a stuffing box or casing, continuous rings surrounding the member to be packed, pressure balanced segmental packing rings alternating with the continuous rings, and obliquely mounted springs adapted to apply the packing pressure to the rings.

3. A packing for piston rods and the like, comprising a stuffing box, continuous rings surrounding the member to be packed, segmental packing rings alternating with the continuous rings, the cross sectional dimensions of said segmental rings being such that the bearing faces thereof in contact with the member to be packed are considerably less than their radial dimensions or widths whereby the axial pressure of the pressure medium on the rings is sufficiently greater than the radial pressure acting inwardly to counteract the radial pressure and thus keep said segmental rings balanced.

4. A packing for pistons and the like, comprising a stuffing box, continuous rings surrounding the member to be packed, segmental packing rings alternating with the continuous rings, the face of each segmental ring which engages the adjacent face of the continuous rings being flat and straight while the opposite face thereof is inclined downwardly and outwardly for a portion of its width and has a recess formed in its inner upper face adjacent the central aperture therein thereby presenting a rubbing surface less in dimension than the radial dimension of said segmental ring.

5. A packing for piston rods and the like, comprising a stuffing box, continuous rings surrounding the member to be packed, segmental packing rings alternating with the continuous rings, the face of each segmental ring which engages the adjacent face of the continuous rings being flat and straight while the opposite face thereof is inclined downwardly and outwardly for a portion of its width and has a recess formed in its inner upper face adjacent the central aperture therein thereby presenting a rubbing surface less in dimension than the radial dimension of said segmental ring, and springs engaging said inclined faces of the segmental rings whereby an oblique pressure is exerted thereon whereby said pressure is divided into radial and axial components.

In testimony whereof I have hereunto set my hand in presence of two subscribing witnesses.

ROBERT ALLEN.

Witnesses:
SAMUEL PERCIVAL,
DAISY NUTLEY.